US012361183B2

(12) United States Patent
Tanaka et al.

(10) Patent No.: US 12,361,183 B2
(45) Date of Patent: Jul. 15, 2025

(54) METHODS OF DESIGNING INFLATABLE SHAPE-MORPHING STRUCTURES WITH TEXTURED PATTERNS

(71) Applicant: Toyota Motor Engineering & Manufacturing North America, Inc., Plano, TX (US)

(72) Inventors: Masato Tanaka, Ann Arbor, MI (US); Tsuyoshi Nomura, Nagoya (JP); Yuyang Song, Ann Arbor, MI (US)

(73) Assignee: Toyota Motor Engineering & Manufacturing North America, Inc., Plano, TX (US)

( * ) Notice: Subject to any disclaimer, the term of this patent is extended or adjusted under 35 U.S.C. 154(b) by 955 days.

(21) Appl. No.: 17/493,088

(22) Filed: Oct. 4, 2021

(65) Prior Publication Data

US 2023/0108120 A1   Apr. 6, 2023

(51) Int. Cl.
| | |
|---|---|
| *G06F 30/10* | (2020.01) |
| *G06F 30/23* | (2020.01) |
| *G06F 113/10* | (2020.01) |
| *G06F 119/18* | (2020.01) |

(52) U.S. Cl.
CPC ............. *G06F 30/10* (2020.01); *G06F 30/23* (2020.01); *G06F 2113/10* (2020.01); *G06F 2119/18* (2020.01)

(58) Field of Classification Search
CPC .. G06F 30/10; G06F 2119/18; G06F 2113/10; G06F 30/23

USPC .......................................................... 703/1
See application file for complete search history.

(56) References Cited

U.S. PATENT DOCUMENTS

| | | |
|---|---|---|
| 9,140,649 B2 | 9/2015 | Hart et al. |
| 10,337,536 B2 | 7/2019 | Niiyama et al. |
| 2022/0013098 A1* | 1/2022 | Dede .................... G10K 11/30 |

OTHER PUBLICATIONS

Ou, J. et al., "aeroMorph—Heat-sealing Inflatable Shape-change Materials for Interaction Design," Massachusetts Institute of Technology, Oct. 16, 2016, 12 pages.

(Continued)

*Primary Examiner* — Brian S Cook
(74) *Attorney, Agent, or Firm* — Christopher G. Darrow; DARROW MUSTAFA PC

(57) ABSTRACT

A method of designing an inflatable structure includes generating a finite element mesh defining a plurality of elements for an inflatable shape-morphing structure, calculating a topology optimization analysis for the inflatable shape-morphing structure having a final shape in an inflated state, wherein the topology optimization analysis determines a plurality of tensors for the plurality of elements of the finite element mesh, converting the plurality of tensors for the plurality of elements into a plurality of diffusion coefficients for the plurality of elements, and generating a space-filling Turing pattern for the inflatable shape-morphing structure as a function of the plurality of diffusion coefficients, wherein the space-filling Turing pattern defines a simulated textured surface for the inflatable shape-morphing structure.

20 Claims, 5 Drawing Sheets

(56) References Cited

OTHER PUBLICATIONS

Giannopoulou, E. et al., "Biological Pattern Based on Reaction-Diffusion Mechanism Employed as Fabrication Strategy for a Shell Structure," IOP Conf. Series.: Mater. Sci. Eng. 471 102053 (2019), 11 pages.
Sierfert, E. et al., "Programming stiff inflatable shells from planar patterned fabrics," Soft Matter, 16, Issue 34, Jul. 14, 2020, pp. 7898-7903, 20 pages.

* cited by examiner

METHODS OF DESIGNING INFLATABLE SHAPE-MORPHING STRUCTURES WITH TEXTURED PATTERNS

TECHNICAL FIELD

The present disclosure generally relates to inflatable structures and, more particularly, to design and manufacturing of inflatable shape-morphing structures.

BACKGROUND

"Soft" robotics and actuators use compliant materials and structures to provide flexible and adaptable grasping and actuation for a range of activities including picking up and/or moving delicate and breakable objects. In addition, such "soft structures" are controlled or actuated using electrostatic forces (e.g., applied voltage to dielectric elastomer actuators), thermal forces (e.g., heating and cooling of shape memory polymers), and/or pressure forces (e.g., inflating and deflating inflatable shape-morphing structures).

Traditional inflatable shape-morphing structures are designed and manufactured with isotropic materials (e.g., fabrics or polymer sheets) such that shape-morphing of a given soft structure is controlled by its initial shape, stitch patterns, and use of different materials. In addition, the design and manufacture of a traditional inflatable shape-morphing structure relies on a designer's expertise and knowledge of inflatable shape-morphing structures combined with trial and error manufacturing to arrive at a desired final shape when inflated.

The present disclosure addresses the issues of designing and manufacturing inflatable shape-morphing structures, among other issues related to inflatable shape-morphing structures.

SUMMARY

This section provides a general summary of the disclosure, and is not a comprehensive disclosure of its full scope or all of its features.

In one form of the present disclosure, a method of designing an inflatable structure includes generating a finite element mesh defining a plurality of elements for an inflatable shape-morphing structure and calculating a topology optimization analysis for the inflatable shape-morphing structure having a final shape in an inflated state. The topology optimization analysis determines a plurality of tensors for the plurality of elements of the finite element mesh and the method converts the plurality of tensors for the plurality of elements into a plurality of diffusion coefficients for the plurality of elements. The method further includes generating a space-filling Turing pattern for the inflatable shape-morphing structure as a function of the plurality of diffusion coefficients and the space-filling Turing pattern defines a simulated textured surface for the inflatable shape-morphing structure.

In another form of the present disclosure, a method of designing an inflatable structure includes generating a finite element mesh for an inflatable shape-morphing structure and calculating a topology optimization analysis for the inflatable shape-morphing structure to have a final shape in an inflated state. Particularly, the topology optimization analysis determines a plurality of orientation tensors configured to control inflation of the inflatable shape-morphing structure such that the inflatable shape-morphing structure has the final shape. The method further includes converting the plurality of orientation tensors into a plurality of diffusion coefficients for the finite element mesh that are used in generating a space-filling Turing pattern for the surface of the inflatable shape-morphing structure via simulation of at least two reaction-diffusion equations. Also, the generated space-filling Turing pattern is used to simulate textured surface for the inflatable shape-morphing structure.

In still another form of the present disclosure, a method of designing an inflatable structure includes generating a finite element mesh defining a plurality of surface elements for a surface of an inflatable shape-morphing structure, calculating a topology optimization analysis for the inflatable shape-morphing structure such that a plurality of calculated orientation tensors control inflation of the inflatable shape-morphing structure into a predefined final shape, and converting the plurality of calculated orientation tensors into a plurality of diffusion coefficients for the plurality of surface elements. The method further includes generating a space-filling Turing pattern for the surface of the inflatable shape-morphing structure using the plurality of diffusion coefficients, generating a textured surface for the inflatable shape-morphing structure as a function of the generated space-filling Turing pattern, and generating CAD data defining a plurality of 3D additive manufacturing voxels for additive manufacturing the inflatable structure with the CAD data being generated as a function of the generated textured surface.

Further areas of applicability and various methods of enhancing the above coupling technology will become apparent from the description provided herein. The description and specific examples in this summary are intended for purposes of illustration only and are not intended to limit the scope of the present disclosure.

BRIEF DESCRIPTION OF THE DRAWINGS

The present teachings will become more fully understood from the detailed description and the accompanying drawings, wherein.

It should be noted that the figures set forth herein are intended to exemplify the general characteristics of the methods, algorithms, and devices among those of the present technology, for the purpose of the description of certain aspects. These figures may not precisely reflect the characteristics of any given aspect, and are not necessarily intended to define or limit specific embodiments within the scope of this technology. Further, certain aspects may incorporate features from a combination of figures.

DETAILED DESCRIPTION

The present disclosure generally relates to methods for designing inflatable shape-morphing structures (also referred to herein simply as "inflatable structures"). The methods automate the design process such that expert knowledge from a designer and/or trial and error manufacturing of inflatable structures is reduced or not needed. The methods include analyzing and simulating a surface of an inflatable structure such that a plurality of tensors (e.g., orientation tensors) that control shape-morphing of the inflatable structure during inflation into a desired final shape is provided. Also, a space-filling Turing pattern on the simulated surface is generated as a function of the plurality of tensors and a textured pattern on the simulated surface is generated as a function of the space-filling Turing pattern. The textured pattern (i.e., the textured surface) controls shape-morphing of the inflatable structure during inflation into a desired final shape and in some variations the shape-filling Turing pattern is used to generate computer aided design (CAD) data for additive manufacturing an inflatable structure with the textured surface.

Figure 1:
FIG. 1 is a side view of an inflatable shape-morphing structure in an un-inflated state.
Figure 2:
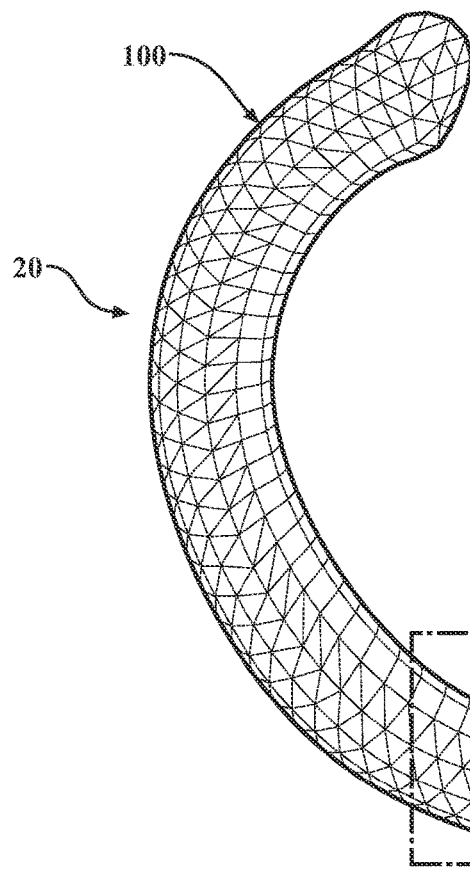
FIG. 2 is a side view of the inflatable shape-morphing structure in FIG. 1 in an inflated state.
Figure 2A:
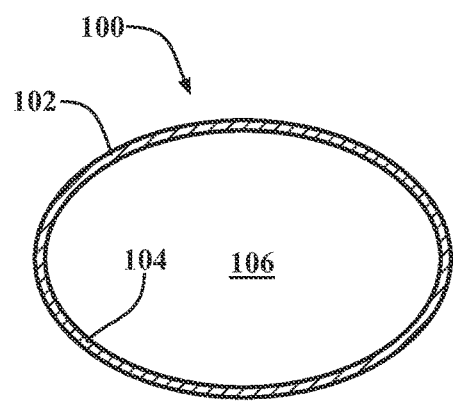
FIG. 2A is a cross-sectional view of section 2A-2A in FIG. 2.

Referring now to FIGS. 1 and 2, a side view of an inflatable structure 10 in an uninflated state is shown in FIG. 1 and a side view of the inflatable structure 10 in an inflated state is shown in FIG. 2. The inflatable structure 10 is formed from a sheet 100 with an outer surface 102, an inner surface 104 and an interior 106 as shown in FIG. 2A. Also, the sheet 100 is a material that maintains or holds pressure within the interior 106 such that the inflatable structure 10, and other inflatable shape-morphing structures disclosed herein, inflates into and has a desired final shape 20.

Figure 2B:
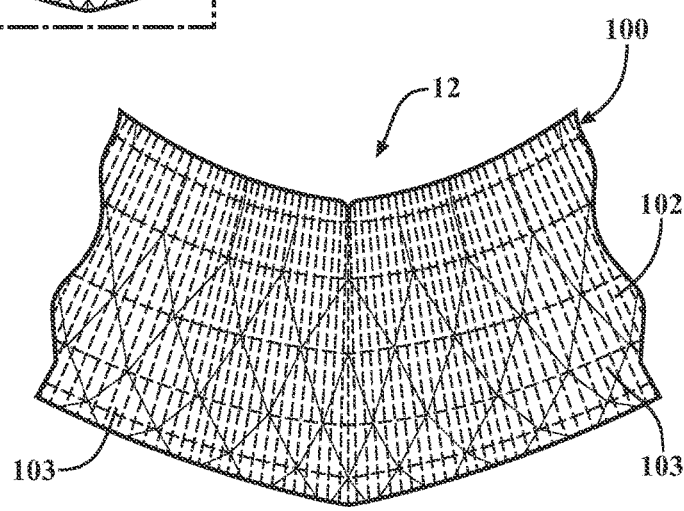
FIG. 2B is an enlarged view of section 2B in FIG. 2.

Referring to FIG. 2B, an enlarged view of section 2B in FIG. 2 is shown. The sheet 100 has stitching 103 configured to control shape-morphing of the inflatable structure 10 during pressurizing (inflating) the interior 106. And as shown in FIG. 2B, the stitching 103 is not regularly or evenly spaced at a bend portion 12 such that the inflatable structure 10 in the uninflated state (FIG. 1) expands and deflects at the bend portion 12 during inflation. It should be understood that the inflatable structure 10 includes additional stitching 103 along its outer surface 102 such that the desired final shape 20 is formed when inflated. However, designing and manufacturing the initial (uninflated) inflatable structure 10 such that the inflatable structure 10 in an inflated state has the desired final shape 20 can be a time and cost intensive process.

Figure 3A:
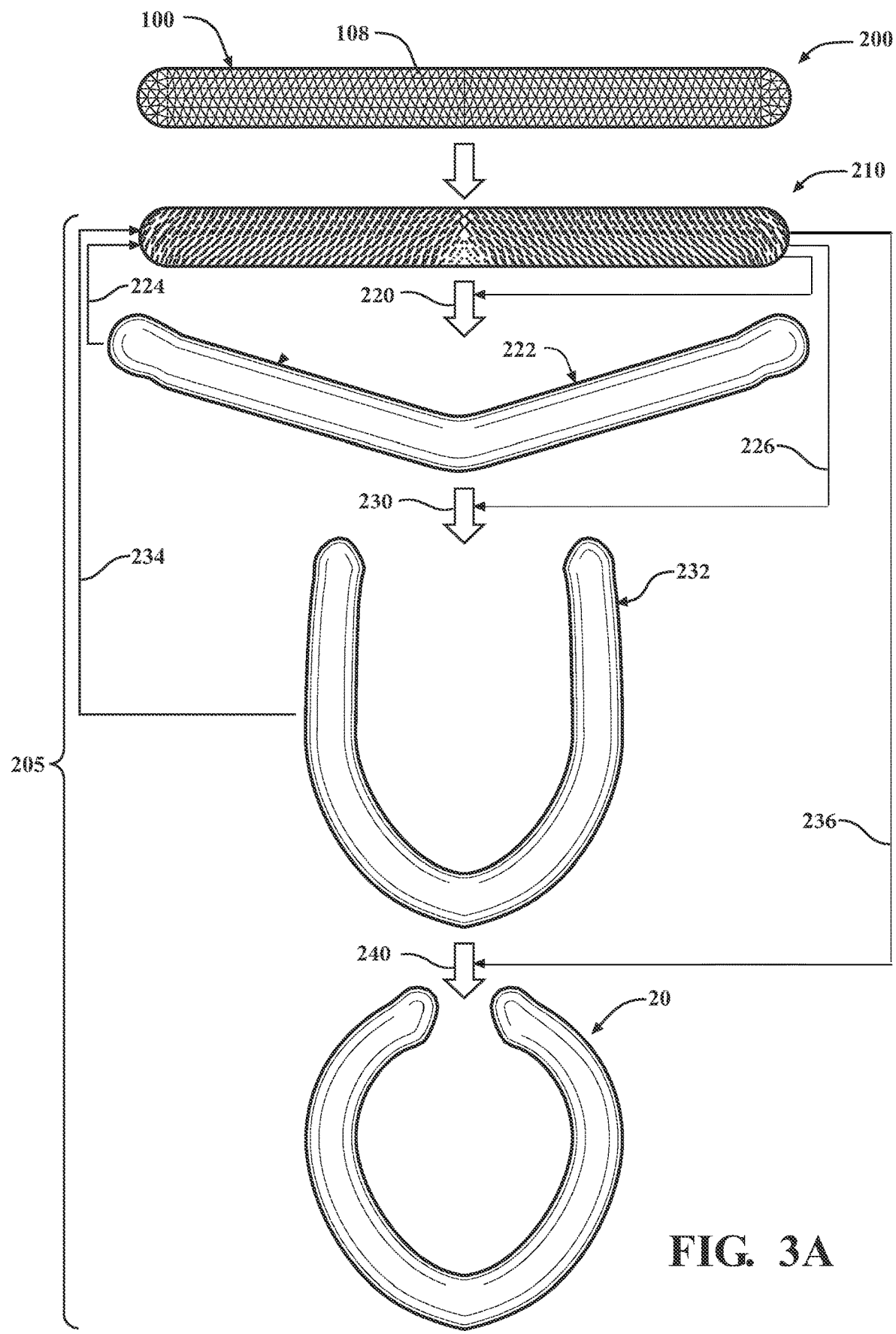
FIG. 3A illustrates a series of steps for a method of designing an inflatable shape-morphing structure according to the teachings of the present disclosure.
Figure 3B:
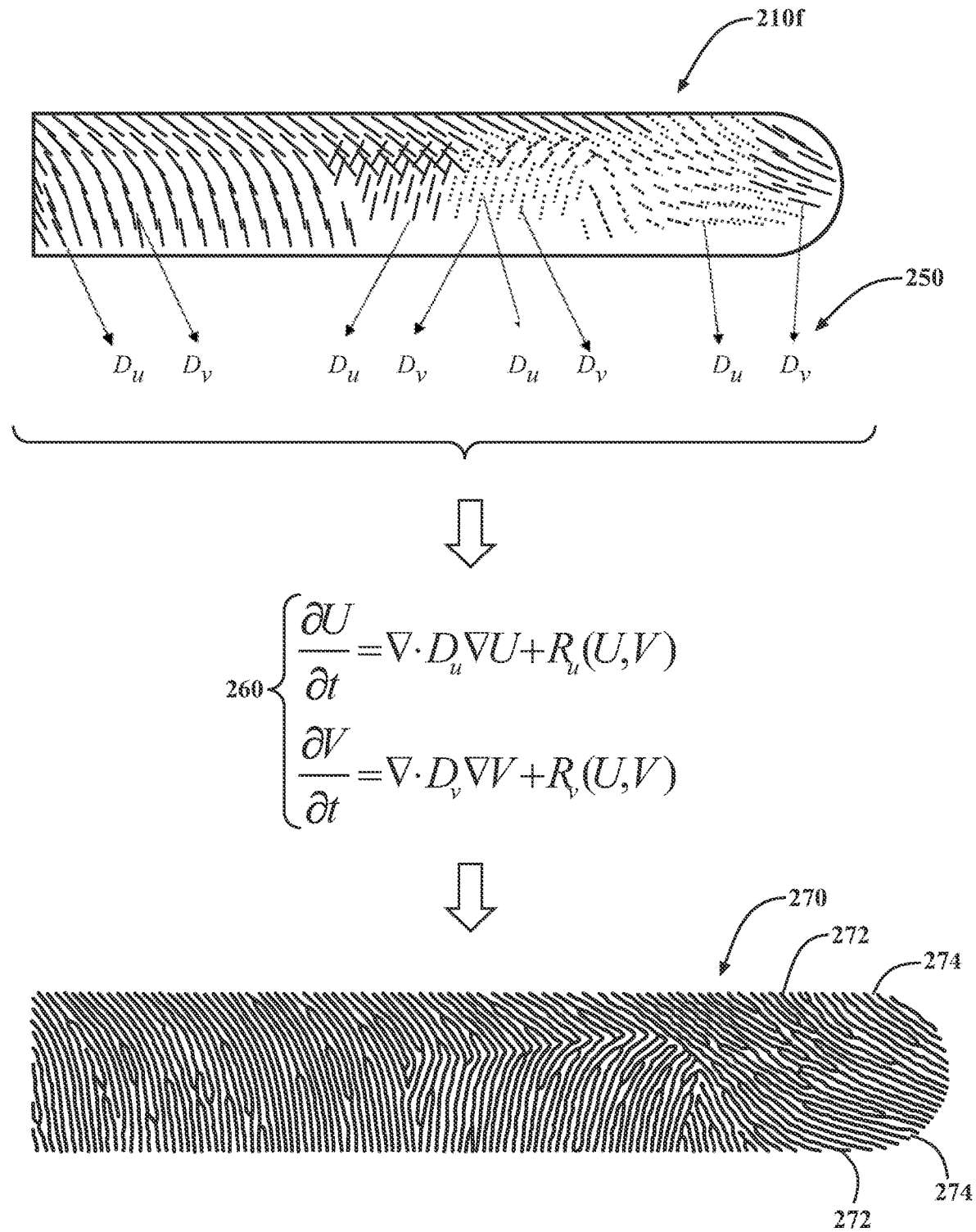
FIG. 3B illustrates additional steps for a method of designing an inflatable shape-morphing structure according to the teachings of the present disclosure.

Referring now to FIGS. 3A and 3B, steps for a method of automated designing of inflatable structures according to the teachings of the present disclosure are shown. Particularly, and assuming an inflatable structure 10 with the desired final shape 20 is desired, FIG. 3A shows a finite element mesh 108 is generated for the sheet 100 of the inflatable structure 10 at 200 and a topology optimization analysis of the sheet 100 is performed at 205. The topology optimization analysis 205 includes an iterative process where a tensor (e.g., a $2^{nd}$ order orientation tensor) is assigned or generated for at least a subset of the elements of the finite element mesh 108 at 210 using a topology optimization model. Inflation of the inflatable structure 10 with an initial set of tensors 212 is simulated at 220, and feedback 224 on the resulting inflated shape 222 compared to the desired final shape 20 is provided to the topology optimization model to generate, update and/or modify the initial set of tensors. Inflating the inflatable structure 10 with a revised or updated set of tensors 226 is simulated at 230, and additional feedback 234 on a revised inflated shape 232 compared to the desired final shape 20 is provided to the topology optimization model to generate, update and/or modify the most recent set of tensors. This iteration (i.e., optimization) continues until a set of revised tensors 236 results in simulation 240 of the inflatable shape-morphing structure 10 into the desired final shape 20 and/or a shape within a predefined tolerance of the desired final shape 20. Accordingly, the topology optimization analysis provides a plurality of tensors for the sheet 100, that if present in a sheet from which the inflatable structure was formed, would result in or provide for an inflatable shape-morphing structure 10 inflating into the desired final shape 20 or to within the predefined tolerance of the desired final shape 20.

Referring to FIG. 3B, a final set of tensors (i.e., revised tensors 236) for a completed or finished topology optimization analysis is shown at 210f (only one-half of the topology optimization analysis shown) and the final set of tensors is used to generate a space-filling Turing pattern 270 for the inflatable shape-morphing structure 10 (e.g., for the outer surface 102 and/or the inner surface 104 of the sheet 100). In some variations, the space-filling Turing pattern 270 is generated or calculated using a Turing reaction-diffusion system with a mathematical model representing two hypothetical chemical substances (U and V) that diffuse in space around each other and enhance or suppress the reproduction of each chemical substance. In such variations, the dimensionless equations for the Turing reaction-diffusion system can be:

$$\frac{\partial U}{\partial t} = \nabla \cdot D_u \nabla U + R_u(U, V) \qquad \text{Eqn. 1}$$

$$\frac{\partial V}{\partial t} = \nabla \cdot D_v \nabla V + R_v(U, V) \qquad \text{Eqn. 2}$$

where:
U, V=hypothetical chemical substances;
$D_u$, $D_v$=anisotropic diffusion coefficients for U, V; and
Ru, Rv=interactive reaction terms for U, V.

For example, see Dede et al., "Inverse design of microchannel fluid flow networks using Turing pattern dehomogenization", Structural and Multidisciplinary Optimization (2020) 62:2203-2210, which is incorporated herein by reference. Also, $D_u$, $D_v$, $R_u$, and Rv can be defined as:

$$D_u(\overline{u}) = (L_u - W_u)\overline{u} \otimes \overline{u} + W_u \delta_{ij} \qquad \text{Eqn. 3}$$

$$D_v(\overline{u}) = (L_v - W_v)\overline{u} \otimes \overline{u} + W_v \delta_{ij} \qquad \text{Eqn. 4}$$

$$R_u(U,V) = (a_u U + b_u V + c_u) - d_u U \qquad \text{Eqn. 5}$$

$$R_v(U,V) = (a_v U + b_v V + c_v) - d_v U \qquad \text{Eqn. 6}$$

where:

$$L_u = l_u^2 W_u \qquad \text{Eqn. 7}$$

$$W_u = (w_u - w)^2 \qquad \text{Eqn. 8}$$

$$L_v = l_v^2 W_v \qquad \text{Eqn. 9}$$

$$W_v = (w_v w)^2 \qquad \text{Eqn. 10}$$

and:

$l_v$, $l_u$=magnitude of anisotropy parameter for U, V, respectively;

$w_v$, $w_u$=channel pitch parameter for U, V, respectively, for generated pattern;

w=lateral magnitude of diffusion; and $\delta_{ij}$=Kronecker delta.

Each of the plurality of tensors from the topology optimization analysis shown at 210f is substituted for a corresponding $2^{nd}$ order sensor $\bar{u} \otimes \bar{u}$ (where $\otimes$ is the dyadic product operator) in Equations 3 and 4 such that a plurality of diffusion coefficients Du, Dv are calculated. Also, by aligning the principal axis of the diffusion tensors with the corresponding orientation tensors from the topology optimization analysis, the orientation of the space filling Turing pattern is controlled. The reaction-diffusion Equations 1 and 2 are calculated as a function of time until an equilibrium state for the reaction-diffusion of the chemical substances U, V is reached and the space-filling Turing pattern 270 with alternating layers or elements 272, 274 (referred to herein simply as "elements 282, 284") is formed. For example, and for the space-filling Turing pattern 270 shown in FIG. 3B, the following values for the coefficients (parameters) were used: $l_u$=1; $l_v$=1; $w_u^2$=0.02, $w_v^2$=0.5, w=0.12; $a_u$=0.08; $b_u$=0.08; cu=0.04; $d_u$=0.03; $a_v$=0.1, $b_v$=0; $c_v$=−0.15; and $d_v$=0.08. In addition, initial values for U and V between 0 and 1 were used. Accordingly, the space-filling Turing pattern 270 is a function of the plurality of tensors determined from the topology optimization analysis that resulted in the uninflated inflatable shape-morphing structure 10 inflating into the desired shape 20.

Figure 4:
FIG. 4 is a side view of an inflatable shape-morphing structure according to the teachings of the present disclosure in an un-inflated state.

In some variations of the present disclosure, the sheet 100 is manufactured with a textured surface that has or mimics the space-filling Turing pattern 270 such that an inflatable shape-morphing structure 10t (FIG. 4) inflates into the desired final shape 20 (FIG. 2). For example, in some variations the space-filling Turing pattern 270 is converted into CAD data for additive manufacturing of the sheet 100 such that at least one of the outer surface 102 and the inner surface 104 has a textured pattern. In at least one variation, the CAD data provides or assigns different thicknesses, different materials, and/or different manufacturing parameters for the alternating elements 272, 274 shown in FIG. 3B. For example, in at least one variation, the CAD data assigns a first thickness to elements 272 (i.e., assigns a first thickness for manufactured and/or simulated elements 272) and a second thickness different than the first thickness to elements 274. In the alternative, or in addition to, the CAD data assigns a first material to elements 272 (i.e., assigns a first material used for the manufacture and/or simulation of elements 272) and a second material different than the first material to elements 274. And in the alternative, or in addition to, the CAD data assigns a first manufacturing parameter to elements 272 (i.e., assigns a first manufacturing parameter used to manufacture and/or simulate the elements 272) and a second manufacturing different than the first manufacturing to elements 274.

Non-limiting examples for the first thickness and/or the second thickness include thicknesses between 0.2 mm and 5 mm, for example, between 0.25 mm and 5 mm, between 0.5 mm and 4 mm, and between 1 mm and 3 mm. Non-limiting examples of the first material and/or the second material include polymer materials with a Young's modulus between about 1.4 MPa and about 1.2 GPa. And non-limiting examples for the first manufacturing parameter and/or the second manufacturing parameter include illumination time for additively manufacturing the elements 272, 274, illumination intensity for additively manufacturing the elements 272, 274, heat input for additively manufacturing the elements 272, 274, and cooling rate for additively manufacturing the elements 272, 274, among others.

It should be understood that in some variations the CAD data can assign different thicknesses, different materials, and/or different manufacturing parameters for 3D additive manufacturing voxels of the alternating elements 272, 274. Stated differently, in some variations one or more of the alternating elements 272, 274 are formed from more than one 3D additive manufacturing voxel and the CAD data assigns a thickness, material, and/or manufacturing parameter to each of the 3D additive manufacturing voxels such that each of the alternating elements 272, 274 has an assigned thickness, material, and/or manufacturing parameter.

Figure 5:
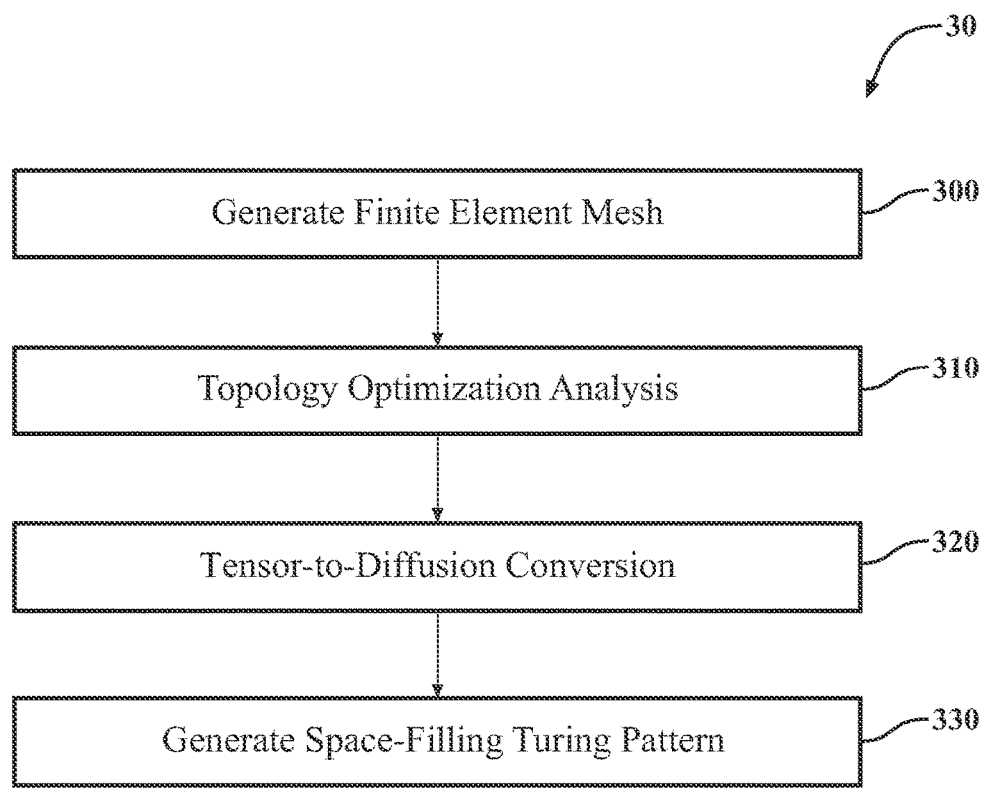
FIG. 5 is a flow chart for a method of designing an inflatable shape-morphing structure according to the teachings of the present disclosure.

Referring now to FIG. 5, a method 30 for designing an inflatable structure includes generating a finite element mesh for the inflatable structure at 300, calculating a topology optimization analysis at 310, converting a plurality of $2^{nd}$ order orientation tensors provided from the topology optimization analysis to a plurality of diffusion coefficients at 320, and generating a space-filling Turing pattern for the inflatable structure at 330.

Figure 6:
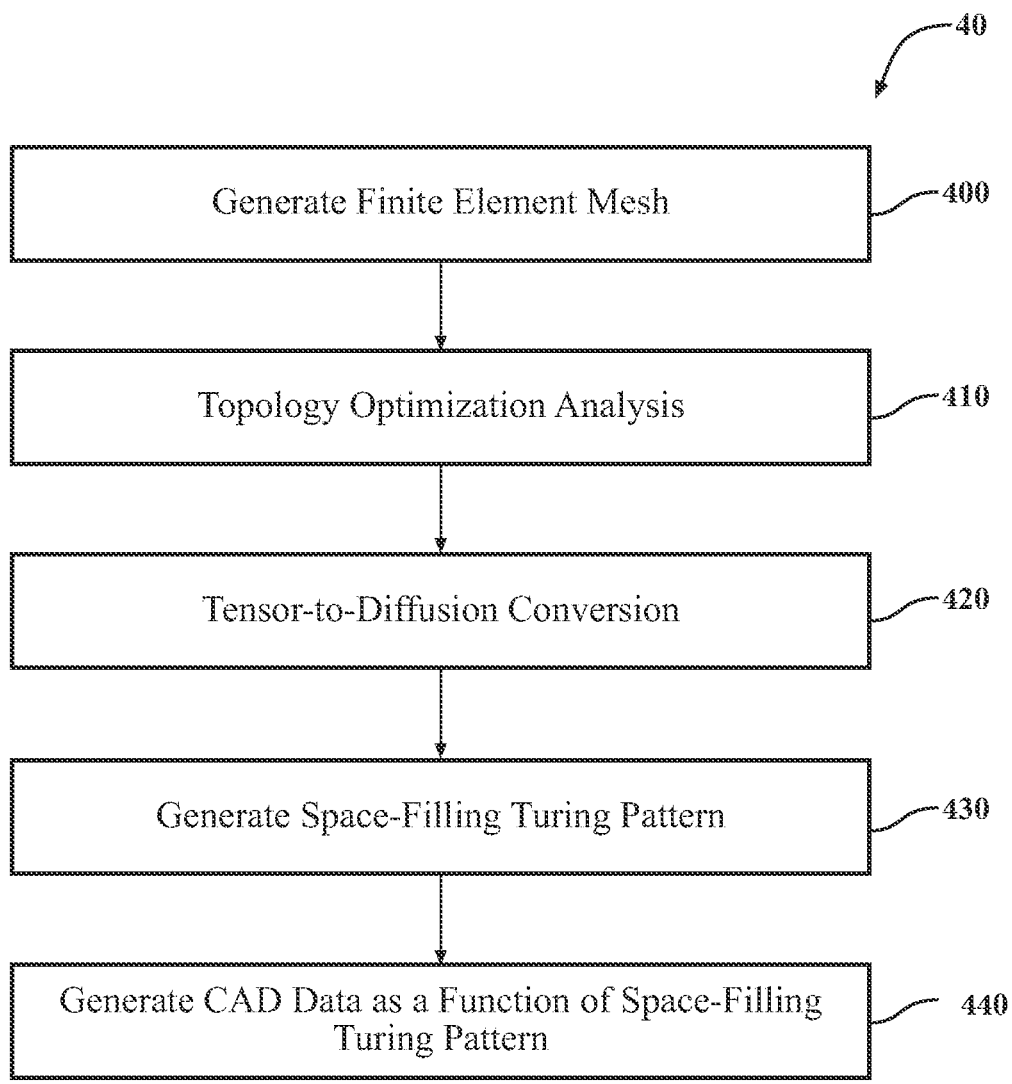
FIG. 6 is a flow chart for another method of designing an inflatable shape-morphing structure according to the teachings of the present disclosure.

Referring to FIG. 6, another method 40 for designing an inflatable structure includes generating a finite element mesh for the inflatable structure at 400, calculating a topology optimization analysis at 410, converting a plurality of $2^{nd}$ order tensors provided from the topology optimization analysis to a plurality of diffusion coefficients at 420, and generating a space-filling Turing pattern for the inflatable structure at 430. In addition, CAD data as a function of the space-filling Turing pattern is generated at 440.

In some variations, the method further includes simulating an inflatable structure formed from a sheet with a textured surface corresponding to the alternating elements of the space-filling Turing pattern, and the alternating elements having the assigned thickness, material, and/or manufacturing parameter. In such variations, the method can include simulating inflating the inflatable structure, comparing the final shape of the inflatable structure to a desired final shape, adjusting one or more parameters of the Turing reaction-diffusion system equations, generating a modified shape-filling Turing pattern, and simulating inflating the inflatable structure having an adjusted textured surface corresponding to the modified shape-filling Turing pattern. It should be understood that this cycle, i.e., simulating inflating the inflatable structure—adjusting parameter(s) of Turing reaction-diffusion system equations—generating modified shape-filling Turing pattern—simulating inflating of modified inflatable structure, can be repeated until a desired final shape is obtained.

It should be understood that the methods described herein can be executed using computers to run or perform the simulations, calculations, and/or generation of results described above.

The foregoing description is merely illustrative in nature and is no way intended to limit the disclosure, its application, or uses. For example, it should be understood that fins with shapes and sizes different than the fins described above are included within the teachings of the present disclosure. Also, work of the presently named inventors, to the extent it may be described in this background section, as well as aspects of the description that may not otherwise qualify as prior art at the time of filing, are neither expressly nor impliedly admitted as prior art against the present technology.

As used herein, the phrase at least one of A, B, and C should be construed to mean a logical (A or B or C), using a non-exclusive logical "or." It should be understood that the various steps within a method may be executed in different order without altering the principles of the present disclosure; various steps may be performed independently or at the same time unless otherwise noted. Disclosure of ranges includes disclosure of all ranges and subdivided ranges within the entire range.

The headings (such as "Background" and "Summary") and sub-headings used herein are intended only for general organization of topics within the present disclosure, and are not intended to limit the disclosure of the technology or any aspect thereof. The recitation of multiple embodiments having stated features is not intended to exclude other embodiments having additional features, or other embodiments incorporating different combinations of the stated features.

As used herein, the terms "comprise" and "include" and their variants are intended to be non-limiting, such that recitation of items in succession or a list is not to the exclusion of other like items that may also be useful in the devices and methods of this technology. Similarly, the terms "can" and "may" and their variants are intended to be non-limiting, such that recitation that an embodiment can or may comprise certain elements or features does not exclude other embodiments of the present technology that do not contain those elements or features.

The broad teachings of the present disclosure can be implemented in a variety of forms. Therefore, while this disclosure includes particular examples, the true scope of the disclosure should not be so limited since other modifications will become apparent to the skilled practitioner upon a study of the specification and the following claims. Reference herein to one aspect, or various aspects means that a particular feature, structure, or characteristic described in connection with an embodiment is included in at least one embodiment or aspect. The appearances of the phrase "in one aspect" (or variations thereof) are not necessarily referring to the same aspect or embodiment.

While particular embodiments have been described, alternatives, modifications, variations, improvements, and substantial equivalents that are or may be presently unforeseen may arise to applicants or others skilled in the art. Accordingly, the appended claims as filed and as they may be amended, are intended to embrace all such alternatives, modifications variations, improvements, and substantial equivalents.

What is claimed is:

1. A method of designing and manufacturing an inflatable structure, the method comprising:
    generating a finite element mesh defining a plurality of elements for an inflatable shape-morphing structure;
    calculating a topology optimization analysis for the inflatable shape-morphing structure having a final shape in an inflated state, the topology optimization analysis determining a plurality of tensors for the plurality of elements of the finite element mesh;
    converting the plurality of tensors for the plurality of elements into a plurality of diffusion coefficients for the plurality of elements;
    generating a space-filling Turing pattern for the inflatable shape-morphing structure as a function of the plurality of diffusion coefficients, wherein the space-filling Turing pattern defines a simulated textured surface for the inflatable shape-morphing structure; and
    3D additive manufacturing the simulated textured surface onto a sheet, configured to hold pressure within an interior thereof, such that the sheet has a textured surface mimicking the space-filling Turing pattern and the inflatable structure is manufactured.

2. The method according to claim 1, wherein the plurality of tensors are configured to control inflation of the inflatable shape-morphing structure such that the inflatable shape-morphing structure has the final shape in the inflated state.

3. The method according to claim 1, wherein the space-filling Turing pattern is generated with a pair of reaction-diffusion equations for a surface of the inflatable shape-morphing structure.

4. The method according to claim 1, wherein the space-filling Turing pattern defines a simulated textured outer surface for the inflatable shape-morphing structure.

5. The method according to claim 1, wherein the space-filling Turing pattern defines a simulated textured inner surface for the inflatable shape-morphing structure.

6. The method according to claim 1, wherein the plurality of tensors is a plurality of orientation tensors for the plurality of elements of the finite element mesh.

7. The method according to claim 1, wherein each of the plurality of diffusion coefficients comprises a $2^{nd}$ order tensor corresponding to a respective one of the plurality of tensors.

8. The method according to claim 1 further comprising generating CAD data for the simulated textured surface of the inflatable shape-morphing structure as a function of the space-filling Turing pattern.

9. The method according to claim 8, wherein the CAD data defines a plurality of 3D additive manufacturing voxels corresponding for the plurality of elements for the inflatable shape-morphing structure.

10. The method according to claim 9, wherein the 3D additive manufacturing CAD data defines at least one of a thickness for each of the plurality of 3D additive manufacturing voxels, a material for each of the plurality of 3D additive manufacturing voxels, and a manufacturing parameter for each of the plurality of 3D additive manufacturing voxels.

11. The method according to claim 9, wherein the 3D additive manufacturing CAD data defines a thickness for each of the plurality of 3D additive manufacturing voxels as function of the space-filling Turing pattern.

12. The method according to claim 9, wherein the 3D additive manufacturing CAD data defines a material for each of the plurality of 3D additive manufacturing voxels.

13. The method according to claim 12, wherein the material for each of the plurality of 3D additive manufacturing voxels is as function of the space-filling Turing pattern.

14. The method according to claim 9, wherein the 3D additive manufacturing CAD data defines a manufacturing parameter for additive manufacturing each of the plurality of 3D additive manufacturing voxels.

15. The method according to claim 14, wherein the manufacturing parameter for each of the plurality of 3D additive manufacturing voxels is as function of the space-filling Turing pattern, and the manufacturing parameter is at least one of an illumination time, an illumination intensity, a heat input, and a cooling rate.

16. A method of designing and manufacturing an inflatable structure, the method comprising:
    generating a finite element mesh for an inflatable shape-morphing structure to be formed from a sheet configured to hold pressure within an interior thereof;

calculating a topology optimization analysis for the inflatable shape-morphing structure having a final shape in an inflated state, wherein the topology optimization analysis determines a plurality of orientation tensors configured to control inflation of the inflatable shape-morphing structure such that the inflatable shape-morphing structure has the final shape;

converting the plurality of orientation tensors into a plurality of diffusion coefficients for the finite element mesh;

generating a space-filling Turing pattern for a surface of the inflatable shape-morphing structure via simulation of at least two reaction-diffusion equations as a function of the plurality of diffusion coefficients;

generating a simulated textured surface for the inflatable shape-morphing structure as a function of the generated space-filling Turing pattern; and manufacturing the sheet with a textured surface mimicking the simulated textured surface such that the inflatable shape-morphing structure is formed.

17. The method according to claim 16 further comprising generating CAD data defining a plurality of 3D additive manufacturing voxels for the inflatable shape-morphing structure.

18. The method according to claim 17, wherein the CAD data defines at least one of a thickness for each of the plurality of 3D additive manufacturing voxels, a material for each of the plurality of 3D additive manufacturing voxels, and a manufacturing parameter for each of the plurality of 3D additive manufacturing voxels.

19. A method of designing and manufacturing an inflatable structure with a predefined final shape, the method comprising:

generating a finite element mesh defining a plurality of elements for a surface of an inflatable shape-morphing structure;

calculating a topology optimization analysis for the inflatable shape-morphing structure such that a plurality of orientation tensors control inflation of the inflatable shape-morphing structure into the predefined final shape;

converting the plurality of orientation tensors into a plurality of diffusion coefficients for the plurality of elements;

generating a space-filling Turing pattern for the inflatable shape-morphing structure using the plurality of diffusion coefficients;

generating a textured surface for the inflatable shape-morphing structure as a function of the generated space-filling Turing pattern;

generating CAD data defining a plurality of 3D additive manufacturing voxels for additive manufacturing the inflatable structure, wherein the CAD data is generated as a function of the texture surface; and 3D additive manufacturing the 3D additive manufacturing voxels onto a sheet, configured to hold pressure within an interior thereof, such that the textured surface mimics the space-filling Turing pattern and the inflatable shape-morphing structure is manufactured.

20. The method according to claim 19, wherein the CAD data defines at least one of a thickness for each of the plurality of 3D additive manufacturing voxels, a material for each of the plurality of 3D additive manufacturing voxels, and a manufacturing parameter for each of the plurality of 3D additive manufacturing voxels.

* * * * *